US007172061B2

(12) United States Patent
Cousins et al.

(10) Patent No.: US 7,172,061 B2
(45) Date of Patent: Feb. 6, 2007

(54) SELF-ADJUSTING CLUTCHES FOR AUTOMOTIVE VEHICLES

(75) Inventors: William L. Cousins, Columbiaville, MI (US); Charles M. Tomlinson, Southfield, MI (US); Donald Eugene Forton, Columbus, MI (US); Ronald G. Mattise, Davisburg, MI (US); Richard D. Nixon, Davisburg, MI (US)

(73) Assignee: General Motors Corporation, Detroit, MI (US)

( * ) Notice: Subject to any disclaimer, the term of this patent is extended or adjusted under 35 U.S.C. 154(b) by 127 days.

(21) Appl. No.: 10/926,177

(22) Filed: Aug. 25, 2004

(65) Prior Publication Data

US 2006/0042905 A1 Mar. 2, 2006

(51) Int. Cl.
*F16D 13/75* (2006.01)
(52) U.S. Cl. ............................. 192/70.25; 192/111 A; 74/501.5 H
(58) Field of Classification Search ............ 74/501.5 H
See application file for complete search history.

(56) References Cited

U.S. PATENT DOCUMENTS

| | | | | |
|---|---|---|---|---|
| 2,421,869 A | * | 6/1947 | Brock ..................... 192/111 A |
| 3,430,745 A | * | 3/1969 | Randol .................... 192/111 A |
| 3,765,522 A | * | 10/1973 | Dahlkvist et al. ......... 192/111 A |
| 3,921,773 A | * | 11/1975 | Dietrich ...................... 192/83 |
| 4,239,098 A | * | 12/1980 | Jacoponi ................. 192/111 A |
| 4,270,646 A | * | 6/1981 | Norcross ................ 192/111 A |
| 4,735,298 A | * | 4/1988 | Hauguel ................. 192/111 A |

FOREIGN PATENT DOCUMENTS

DE 4317487 A1 * 12/1994

* cited by examiner

*Primary Examiner*—Richard M. Lorence
(74) *Attorney, Agent, or Firm*—Laura C. Hargitt

(57) ABSTRACT

Self-adjusting clutches for automotive vehicles include a hydraulic cylinder as part of a clutch linkage connecting a clutch foot pedal to a clutch plate biased by a clutch spring to urge a friction disk into engagement with a flywheel of an engine. The hydraulic cylinder has a housing with a stop thereon that engages a bracket fixed to the vehicle when the clutch is engaged under the bias of the clutch spring. A piston within the housing is connected through a linkage in the form of a cable or rod assembly to the clutch. As the clutch wears, the piston is pulled toward the clutch for elongating the hydraulic cylinder to compensate for clutch wear by adjusting the length of the clutch linkage. A valve within the hydraulic cylinder is connected to the clutch pedal and is closed upon pressing the clutch pedal to retain the elongated length of the hydraulic cylinder and thus the adjusted length of the clutch linkage while the clutch is disengaged.

7 Claims, 11 Drawing Sheets

SELF-ADJUSTING CLUTCHES FOR AUTOMOTIVE VEHICLES

FIELD OF THE INVENTION

This invention relates to self-adjusting clutches for automotive vehicles. More particularly, this invention relates to self-adjusting clutches for automotive vehicles wherein the clutches have compensators that adjust for wear of friction surfaces within the clutches.

BACKGROUND OF THE INVENTION

In some automotive vehicles a manual clutch is disposed between a flywheel and a manual transmission to disengage an engine from vehicle road wheels when it is necessary to change transmission speeds or brake. Manual automotive clutches generally include a plate and a friction disk that is normally urged by a clutch spring to engage an opposing surface on the flywheel. Over time, the friction disk wears and decreases in thickness. In automotive clutches there is a linkage between a clutch pedal and the clutch plate, which linkage overcomes the bias of the clutch spring when the clutch pedal is pressed to pull the clutch plate away from the flywheel via the clutch linkage. As the friction disk wears and decreases in thickness, the distance that the clutch plate travels in order to insure disengagement of the disk from the flywheel increases. In order to compensate for this increased distance, it is necessary to lengthen the linkage so that the plate engages the disk with sufficient force to avoid slippage. Slippage further accelerates clutch wear and can result in the need for expensive clutch maintenance or clutch replacement.

It is current practice to make manual elongation adjustments in the linkage after wear is detected by the owner/operator. A current technique for alerting the owner/operator of clutch wear is to provide about 1½ to 2 inches of pedal free play at the top of the clutch pedal stroke during manufacture of the vehicle. As the clutch disk wears, pressure plate travel is reduced, which indicates to the owner/operator a need for distance adjustment of pedal travel.

In addition, over-travel during clutch disengagement from the flywheel can damage the clutch pressure plate. In view of these considerations, there is a need for a self-adjusting clutch system requiring minimal operator maintenance and minimal adjustment of pedal free play, while providing adequate engagement during operation to maximize clutch life and to minimize the possibility of clutch plate damage due to overtravel.

SUMMARY OF THE INVENTION

A self-adjusting clutch system for automotive vehicles includes a hydraulic cylinder positioned in a clutch linkage disposed between a clutch pedal and clutch plate that is normally biased by a clutch spring to press a friction disk into engagement with a flywheel. The hydraulic cylinder provides an automatic increase in the length of the clutch linkage as the friction disk wears during use.

In a further aspect of the system, when the clutch pedal is not being cycled, an open valve condition occurs within the hydraulic cylinder, so that as the friction disk wears, the clutch spring causes hydraulic fluid within the cylinder to migrate from a first compartment in the cylinder to a second compartment. This allows a piston in the cylinder that is connected to the linkage to move toward the clutch, thus lengthening the linkage. As the operator presses the clutch pedal, the open valve in the hydraulic cylinder is closed, providing for translation of the entire hydraulic cylinder at a fixed length that has been adjusted to compensate for wear of the friction disk.

BRIEF DESCRIPTION OF THE DRAWINGS

Various other features and attendant advantages of the present invention will be more fully appreciated as the same becomes better understood when considered in conjunction with the accompanying drawings, in which like reference characters designate the same or similar parts throughout the several views, and wherein.

DETAILED DESCRIPTION

Figure 1:
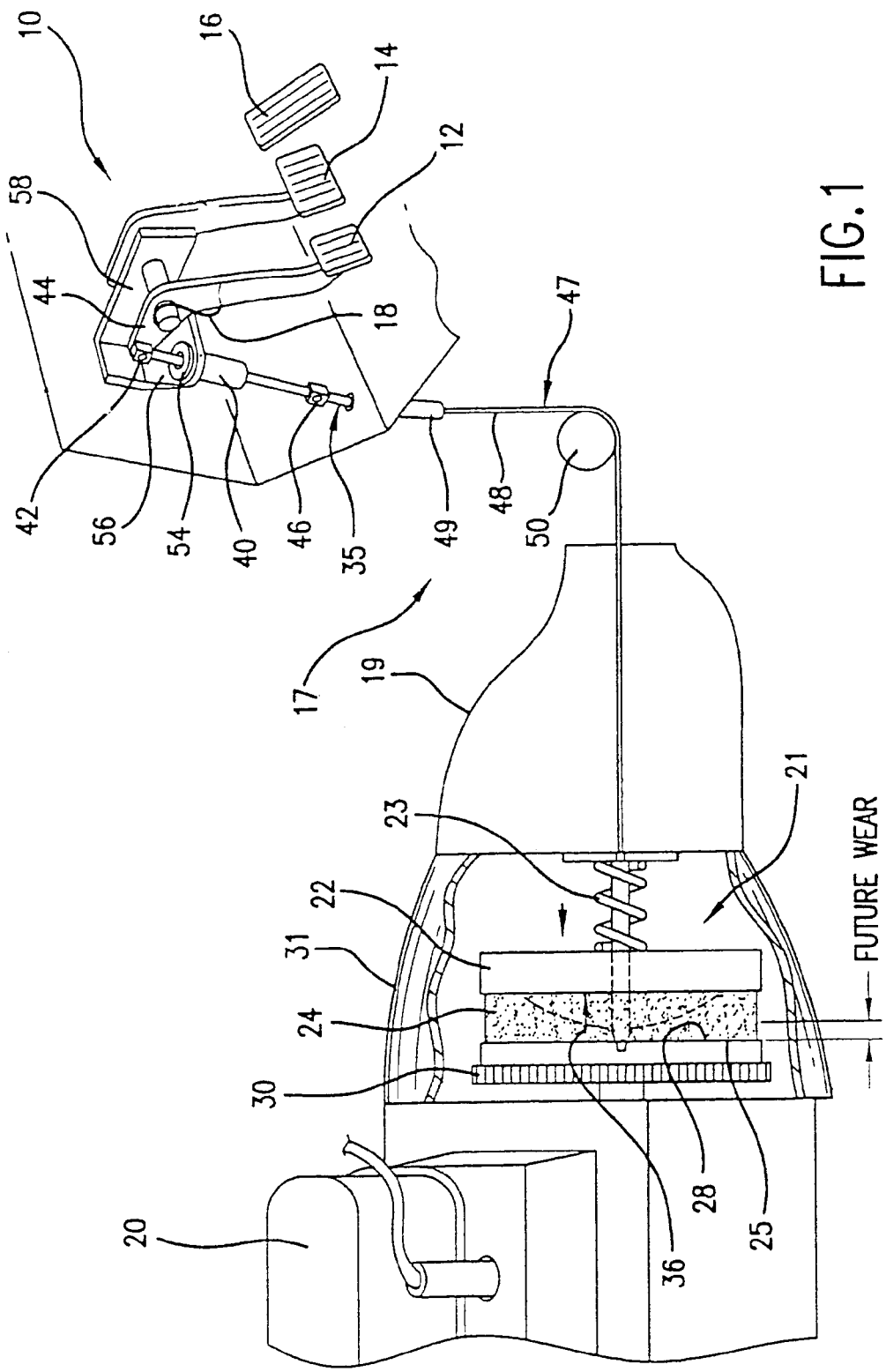
FIG. 1 is a perspective view of a pedal configuration for an automotive vehicle showing a clutch arrangement with a clutch pedal in a rest mode during which a schematically illustrated clutch is engaged with the flywheel of an engine.

Referring now to FIG. 1, there is shown a pedal arrangement 10 for an automotive vehicle which includes a clutch pedal 12, a brake pedal 14 and an accelerator pedal 16. The clutch pedal 12 initiates disengagement of a clutch system 17 when pressed to rotate in the clockwise direction against the bias of a pedal spring 18 to manually disengage a transmission 19 from an engine 20 by operating a schematically illustrated clutch 21. In the illustrated configuration, the clutch 21 has a clutch plate 22 which under the bias of a clutch spring 23 pushes at least one friction disk 24 having a friction face 25 against an opposed face 28 of a flywheel 30 driven by the engine 20 and disposed within a clutch housing 31. The clutch spring 23 normally holds the clutch 21 in engagement to couple the transmission 19 to the flywheel 30 in order to rotate road wheels (not shown) of the automotive vehicle. In order to disengage the clutch 21 prior to shifting the transmission 19 or prior to stopping the vehicle, the clutch pedal 12 is pressed against the bias of the pedal spring 18 which pulls a linkage 35 attached to the clutch plate 22 back against the bias of the clutch spring 23. This pulls the clutch plate 22 back from the friction disk 24, allowing the friction disk under the opposite bias of a separate spring 36 to separate from the face 28 of the flywheel 30. During use, the friction disk 24 wears, reducing its thickness.

In accordance with the present invention, the clutch linkage 35 includes a hydraulic cylinder 40 having a first end portion 42 connected to a lever arm 44 of the pedal 12 and a second end portion 46 connected to a linkage portion 47 which extends to the clutch plate 22. In the illustrated embodiment, the linkage portion 47 is a cable 48 which is initially guided within a sheath 49 and is trained over pulleys 50. In another arrangement (now shown), the linkage portion 47 is configured as a rod linkage.

The hydraulic cylinder 40 has an external stop flange 54, which when the clutch 21 is engaged, abuts a stop seat 56 on a bracket 58 that is fixed with respect to the body of the automotive vehicle and thus fixed with respect to the clutch housing 31.

As the friction disk 24 in the clutch housing 31 wears during use, the thickness of the friction disk decreases causing the face 25 of the friction disk to move further toward the face 28 of the flywheel 30. This wear pulls the second end portion 46 of the hydraulic cylinder 40 linearly away from the stop flange 54 on the hydraulic cylinder thereby lengthening the clutch linkage 35.

Figure 2:
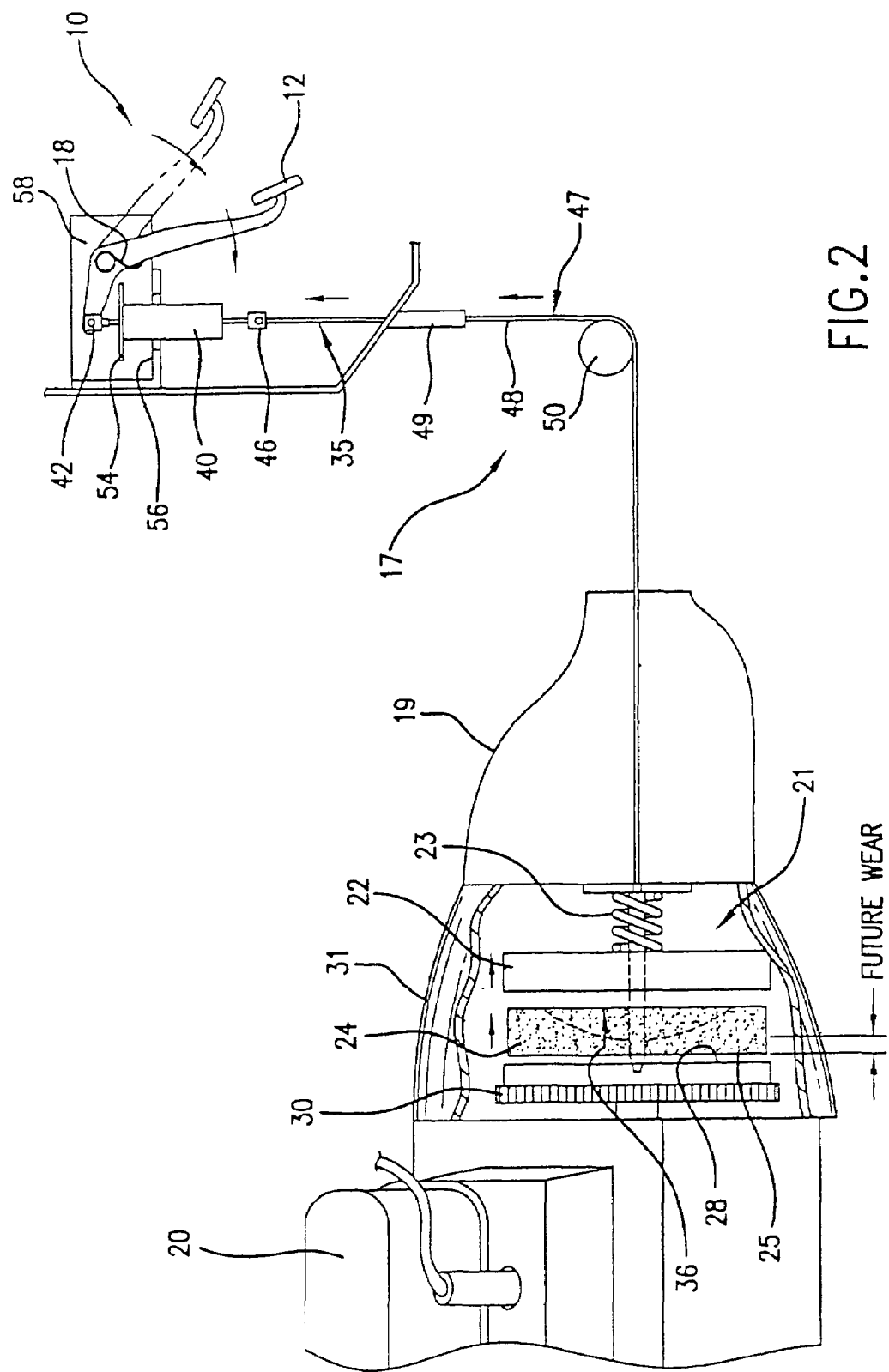
FIG. 2 is a side view of the clutch arrangement of FIG. 1 showing the schematically illustrated clutch of FIG. 1 being disengaged.

As is seen in FIG. 2, when the clutch pedal 12 is pressed to rotate against the bias of the pedal spring 18, the entire cltch linkage 35 is pulled to disengaged the clutch plate 22 from the friction disk 24 so as to allow the friction disk to disengaged under the bias of spring 36 fron the 28 of the flywheel 30. As the pedal 12 is pressed, the hydraulic cylinder 40 is lifted with respect to the stop seat 56 so that the stop flange 54 disengaged from the stop 56.

In accordace with the present invention, while the clutch 19 is being operated by the pedal 12, the first and second end portion 42 and 46 projecting from the hydraulic cylinder 40 remain fixed with respect to the hydraulic cylinder 40. Acorrdingly, the length of the clutch linkage 35 remains fixed during disengagement if the friction disk 24 from the flywheel 30. upon releasing the clutch pedal 12, the clutch 18 returns the clutch pedal to the FIG. 1 position whilr the clutch spring 23 returns the clutch plate 22 to reengaged the frictin disk 24 with the opposed face 28 if the flywheel 30. During repeated engagements and disengagements, the friction surface 25 in the friction disk 24 waers. In accordance with the present invention, valving allows piston monement within the ydaulic cylinder 40 lengthen the distance between the flange 54 and the end if the second end portion 46 of the hydraulic cylinder during engagement if the clutch 21. This comensates for wear of the friction surface 25 which reduces the thickness of the friction disk 24.

Figure 3:
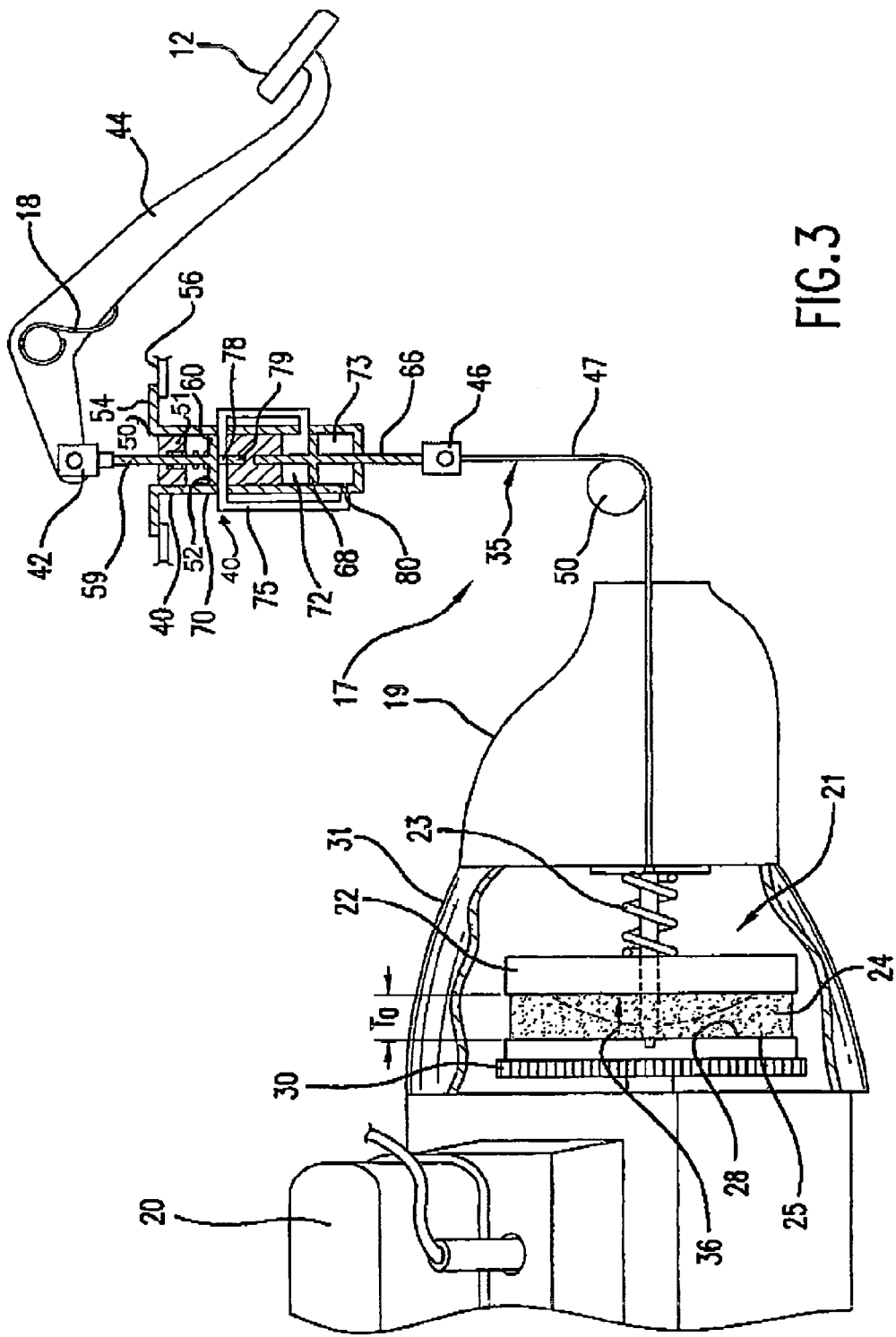
FIG. 3 is a side view of a first embodiment of the clutch arrangement of FIGS. 1 and 2 showing a hydraulic cylinder in elevation, and schematically showing the engaged clutch prior to wear.
Figure 4:
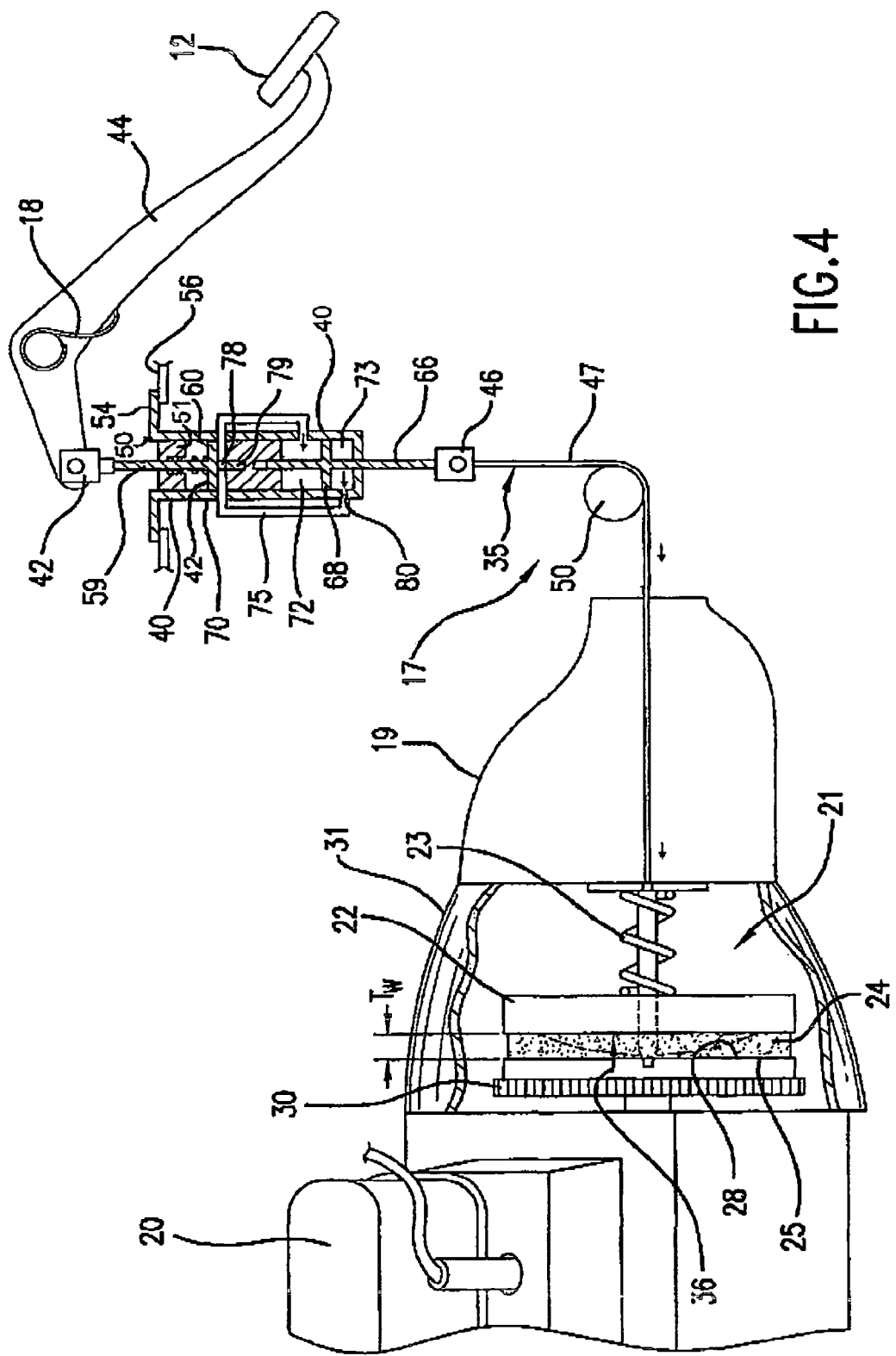
FIG. 4 is a view similar to FIG. 3 showing the position of components in the hydraulic cylinder subsequent to clutch wear.

Referring now to FIGS. 3–6 there is shown a first specific embodiment of the clutch system 17 illustrated in FIGS. 1 and 2. In FIG. 3, the schematically illustrated clutch plate 22 is engaged with a friction disk 24 having little or no wear and having an original thickness $T_o$. In FIG. 4 there has been wear so that the thickness of the friction disk 24 is now $T_w$ which is less than $T_o$.

In order to compensate for this change in thickness of the friction disk 24, the hydraulic cylinder 40 is constructed and arranged with the first end portion 42 configured as an actuator rod 59 extending from a plunger portion 60 of the actuator rod and connected to the leaver and 44 of the pedal 12. There is a stop 51 within the hydraulic cylinder 40 adjacent to the top end 50 thereof that is engaged by an engagement surface 52 the actuator rod 59. The second end portion 46 of the hydraulic cylinder 40 is attached to a piston rod 66 extending from a piston 68 within a housing 70 of the hydraulic cylinder 40. The piston 68 divides the housing into a first chamber 72 and a second chamber 73. The first chamber 73 is connected to the second chamber 72 by a fluid passage 75. As the friction disk 24 of clutch 21 wean, the clutch spring 23 urges the clutch plate 22 toward the flywheel 30, which pulls the piston rod 66 of the piston 68 further out of the housing 70 of the hydraulic cylinder 41 and toward the housing 31 of clutch 21 and the flywheel 30, thereby increasing the length of the hydraulic cylinder. This causes the piston 68 to move from the FIG. 3 position toward the FIG. 4 position, urging hydraulic fluid in the second chamber 73 into the passage 75 for transfer to the first chamber 72 on the opposite side of the piston 68.

In FIGS. 3 and 4, a valve port 78 provides a normally open valve through a stem 79 extending from the plunger 60 and allows hydraulic fluid to pass though the stem to the second chamber 73. A check valve 80 is also preferably employed to keep hydraulic fluid from returning through the fluid flow passage 75 from the first chamber 72 to the second chamber 73.

Figure 5:
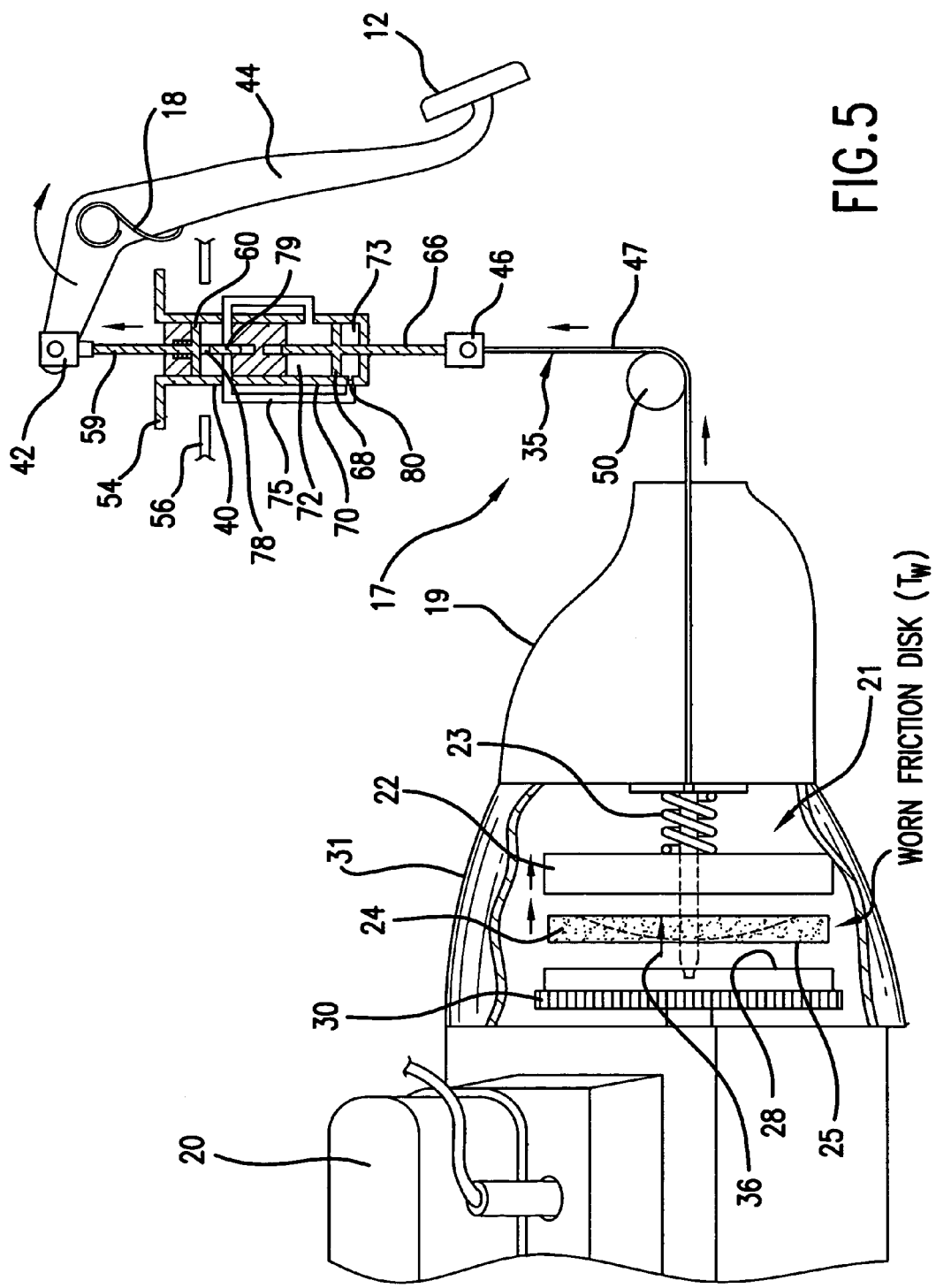
FIG. 5 is a view similar to FIGS. 3 and 4 showing the clutch being disengaged subsequent to clutch wear.

It is necessary to retain the adjusted increased length of the hydraulic cylinder 40 of FIG. 4 upon pressing the pedal 12. Consequently, as is seen in FIG. 5, upon pressing the pedal 12 to rotate the pedal arm 44, the actuator rod 59 is pulled from the FIG. 4 position to the FIG. 5 position. This misaligns the valve opening 78 with the fluid flow passage 75 blocking the fluid flow passage 75 with the stem 79. Consequently, the length of the clutch linkage 35 is determined in FIG. 5 before the clutch linkage disengages the clutch 21. In FIG. 5, the stop flange 54 is lifted from the stop seat 56, but the length of the clutch linkage 35, which includes the increased length of the hydraulic cylinder 40, remains the same as it was in FIG. 4. Upon releasing the clutch pedal 12, the clutch arrangement returns to the condition of FIG. 4 that continually compensates for wear of the friction disk 24.

Figure 6:
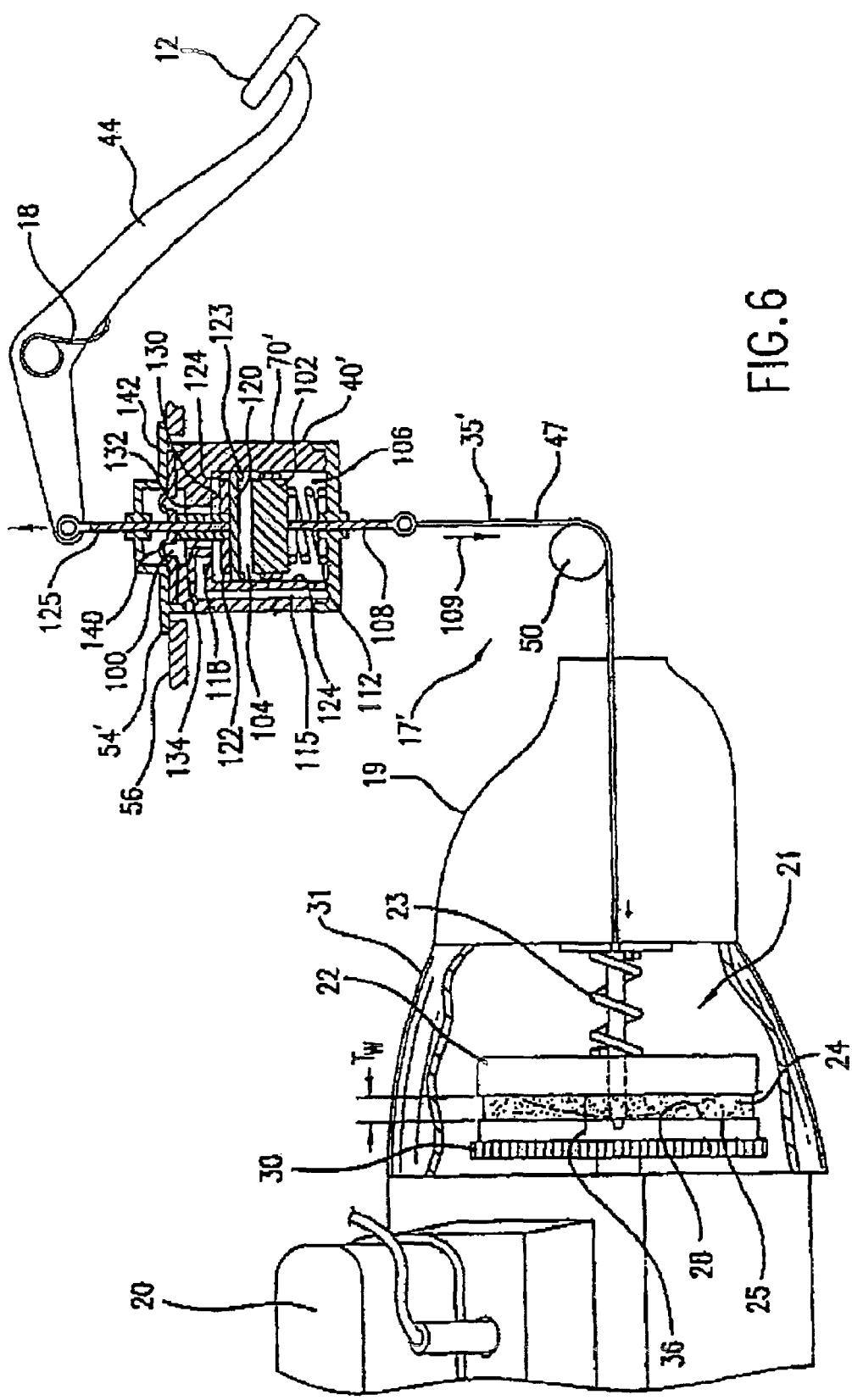
FIG. 6 is a side view of a second embodiment of the clutch arrangement of FIGS. 1 and 2 showing the position of components in the hydraulic cylinder subsequent to clutch wear.
Figure 7:
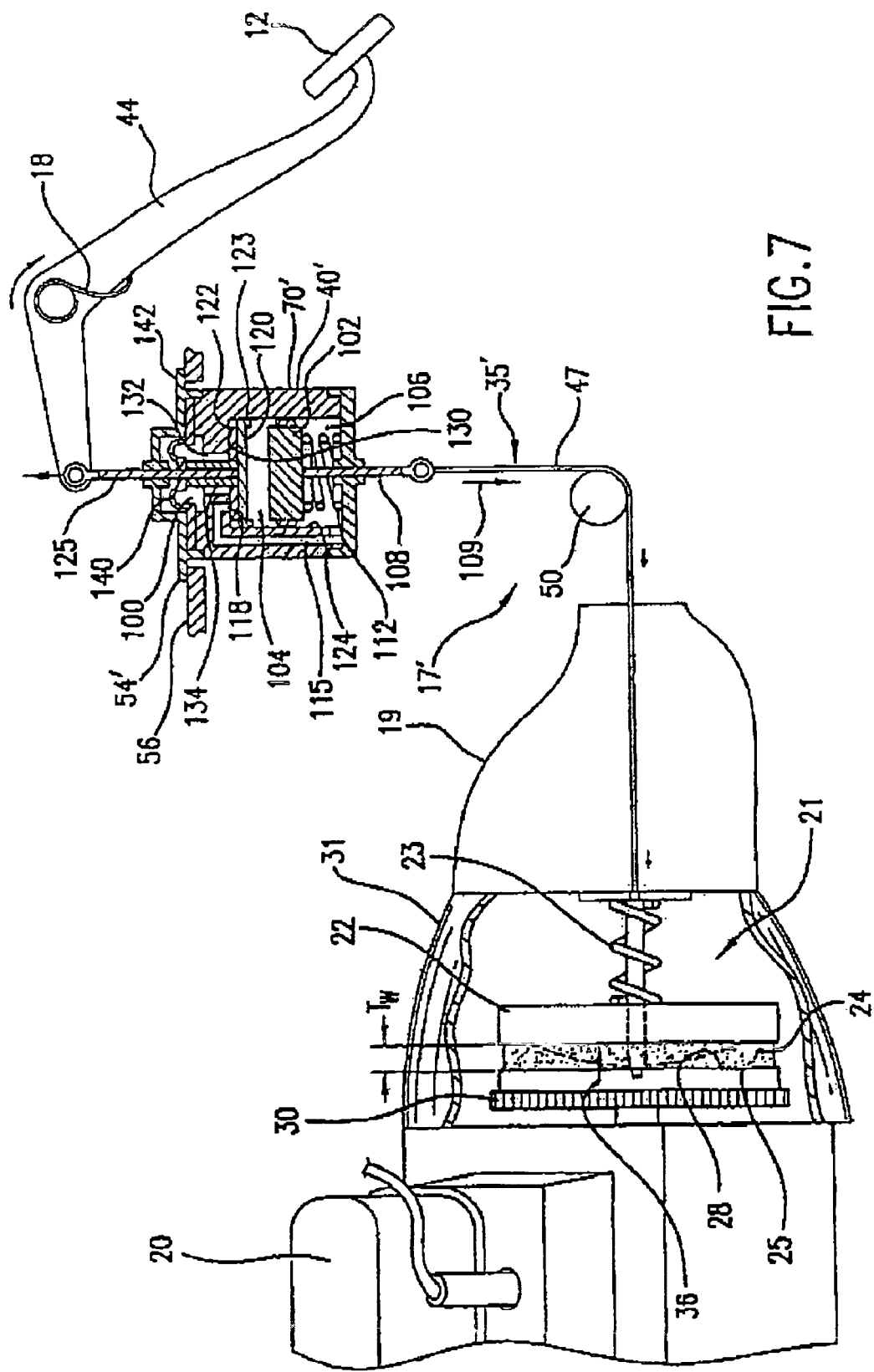
FIG. 7 is a view similar to FIG. 6 showing the position of components in the hydraulic cylinder subsequent to clutch wear, as the pedal is pressed and initially moves, but before the clutch is disengaged.
Figure 8:
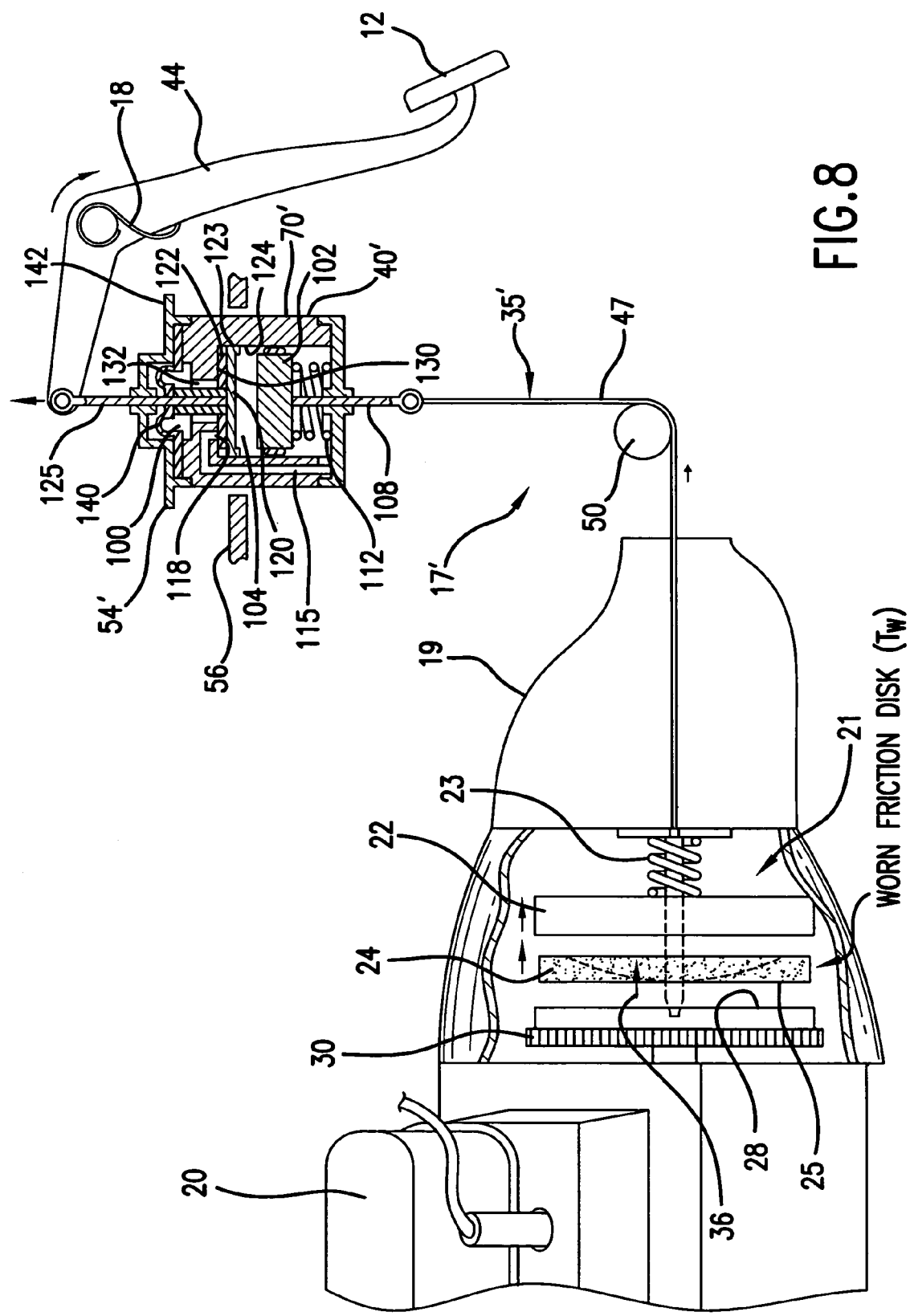
FIG. 8 is a view similar to FIGS. 6 and 7 but showing the hydraulic cylinder after the pedal is pressed sufficiently to disengage the clutch.

Referring now to FIGS. 6, 7 and 8 where a second and preferred embodiment 17' of the clutch system 17 of FIGS. 1 and 2 is shown, it is seen that the hydraulic cylinder 40' has a reservoir 100 associated therewith for receiving hydraulic fluid displaced by a piston 102. The reservoir 100 is integral with the hydraulic cylinder 40'. The piston 102 divides the housing 70' of the hydraulic cylinder 40' into a first chamber 104 and a second chamber 106. The piston 102 is connected by a piston rod 108 to the clutch linkage portion 47 that may be a cable 48 or a rod linkage. Consequently, the clutch spring 23 pulls the piston 102 in the direction of arrow 109 against the bias of a coil spring 112 within the housing 70' that urges the piston 102 toward the first chamber 104 of the hydraulic cylinder 40'. The clutch spring 23 is a stronger spring than the piston spring 112 and pulls the piston 102 to initially slightly compress the piston spring 112 as the friction disk 24 wears. In the engaged state of FIG. 6, where the pedal 12 is not pressed, hydraulic fluid in the second chamber 106 can be pushed through a fluid passage 115 in the wall of the hydraulic cylinder housing 70', which fluid passage has an axially directed opening 118 that communicates with the first chamber 104.

Disposed in the chamber 104 is an actuator piston 120. The actuator piston 120 has a face seal 122 thereon and an annular non-sealing preiphery 123 that allows hydraulis fliud to flow between the input poston 120 and a cylindrical wall surface 124 of the housing 70'. as is seen in FIG. 6, while the clutch 21 is engaged, the pedal arm 44 applies minimal force on a poston rod 125 extended from the actuator piston 120. Also while the clutch 21 is engaged, the piston 102 is urged against the bis of the piston spring 112 by the clutch spring 23. This forces hydraulic fluid out if the secind chamber 106, through the passage 115 and into the chamber 104 vis the axial opening 118.

Disposed in an end wall 130 of the hydraulic cylinder housing 70' is a fluid passage 132 through which the piston rod 125 projects. The piston rod 124 has a collar 134 there around that extends with the piston rod through the fluid passage 132. The hydraulic fluid from the second chamber 106 that has migrated through the fluid passage 115 also passes through the annular fluid passage 132 into the reservoir 100. Optionally, the reservoir 100 is configured with an annular bladder 140 that is retained around the periphery of the reservoir by an end cap 142. The end cap 142 of the housing 70' has a circular flange 54' projecting therefrom that provides a stop flange for engaging the stop seat 56 on bracket 58 (also see FIGS. 1 and 2) of the automotive vehicle.

As the friction disk 24 wears, the clutch linkage 35' elongates to accommodate the wear while the clutch 21 is engaged. It is preferred that the actuator piston 120 initially hold the face seal 122 against the end of the housing 70' closing the axial opening 118 and the fluid passage 132, however the system is self-adjusting and a tight seal between the face seal and the axial opening and fluid passage is not essential when the system is at rest with the clutch 21 in engagement, as seen in FIG. 6.

Referring now to FIG. 7, upon pressing the pedal 12 against the bias of the pedal spring 18, the input piston 120 is pulled to the end of the first chamber 104 and seals the axial passage 118 and the annular passage 136. This hydraulically locks the piston 102 in place so that the piston 102 does not move further against the piston spring 112 and fixes the length of the entire clutch linkage 35'. The annular bladder 140 is pulled upward as the piston rod 125 is pulled up by the pedal arm 44 causing the bladder 140 to expand to accommodate additional hydraulic fluid.

As is seen in FIG. 8, continued pressure on the pedal 12 pulls the now hydraulically locked cylinder 40' away from the stop surface 56 and overcomes the bias of the clutch spring 23 to disengage the clutch 21 while the displaced hydraulic fluid remains accumulated in the reservoir 100 due to the sealing face 122 on the actuator piston 120 closing the axial passage 118 and the annular passage 132. Upon releasing the clutch pedal 12, the system returns to the state shown in FIG. 6 where the fluid passage 115 and reservoir 100 are unsealed by the face seal 122, so that as the friction disk 24 continues to wear, hydraulic fluid in the second chamber 106 can continue to flow out of the second chamber and through the fluid passage 115 into the first chamber 104 to adjust the length of the clutch linkage 35'.

Figure 9:
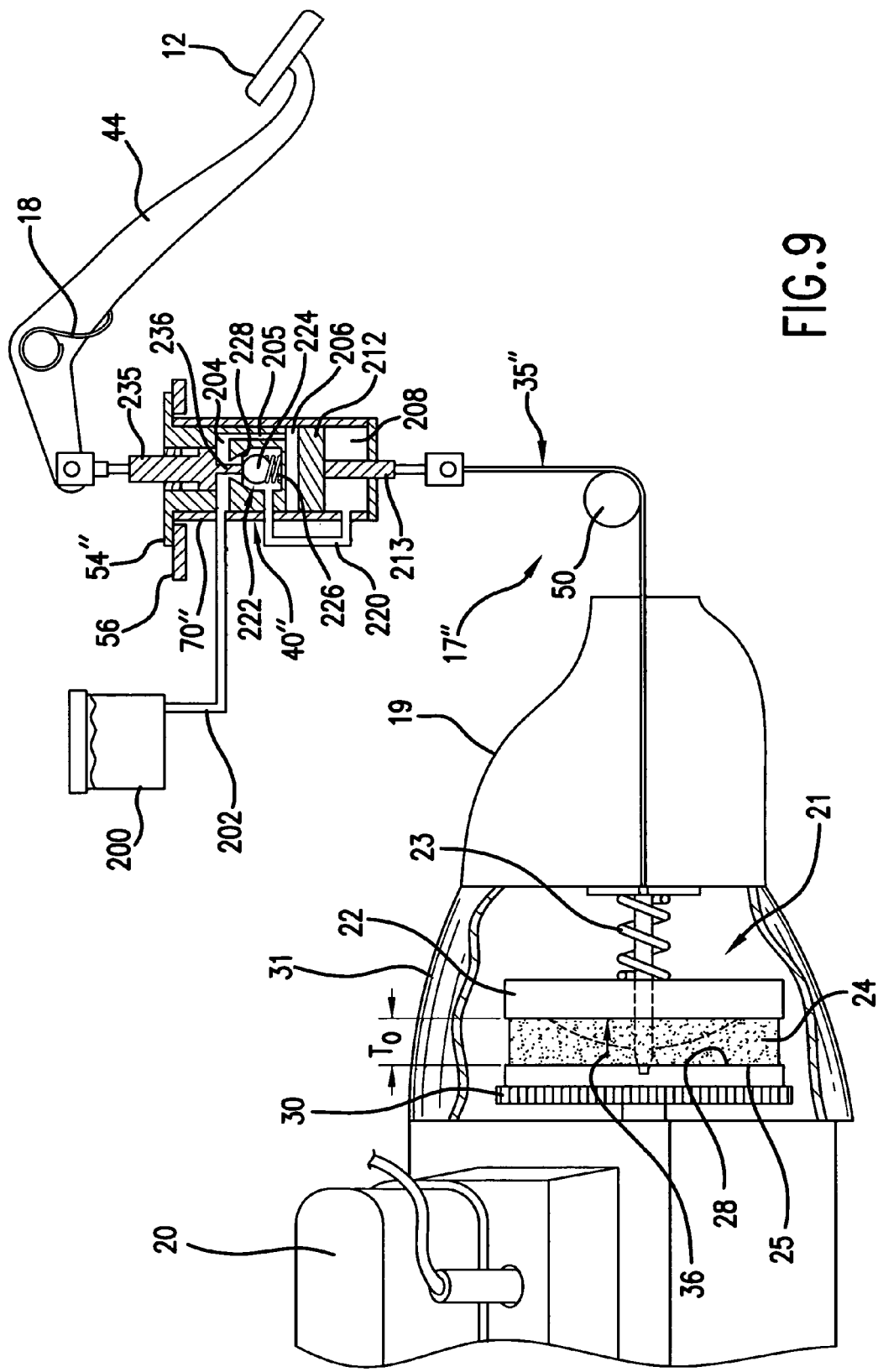
FIG. 9 is a side elevation of a third embodiment of the clutch arrangement of FIGS. 1 and 2 showing the clutch in the engaged position prior to wear.
Figure 10:
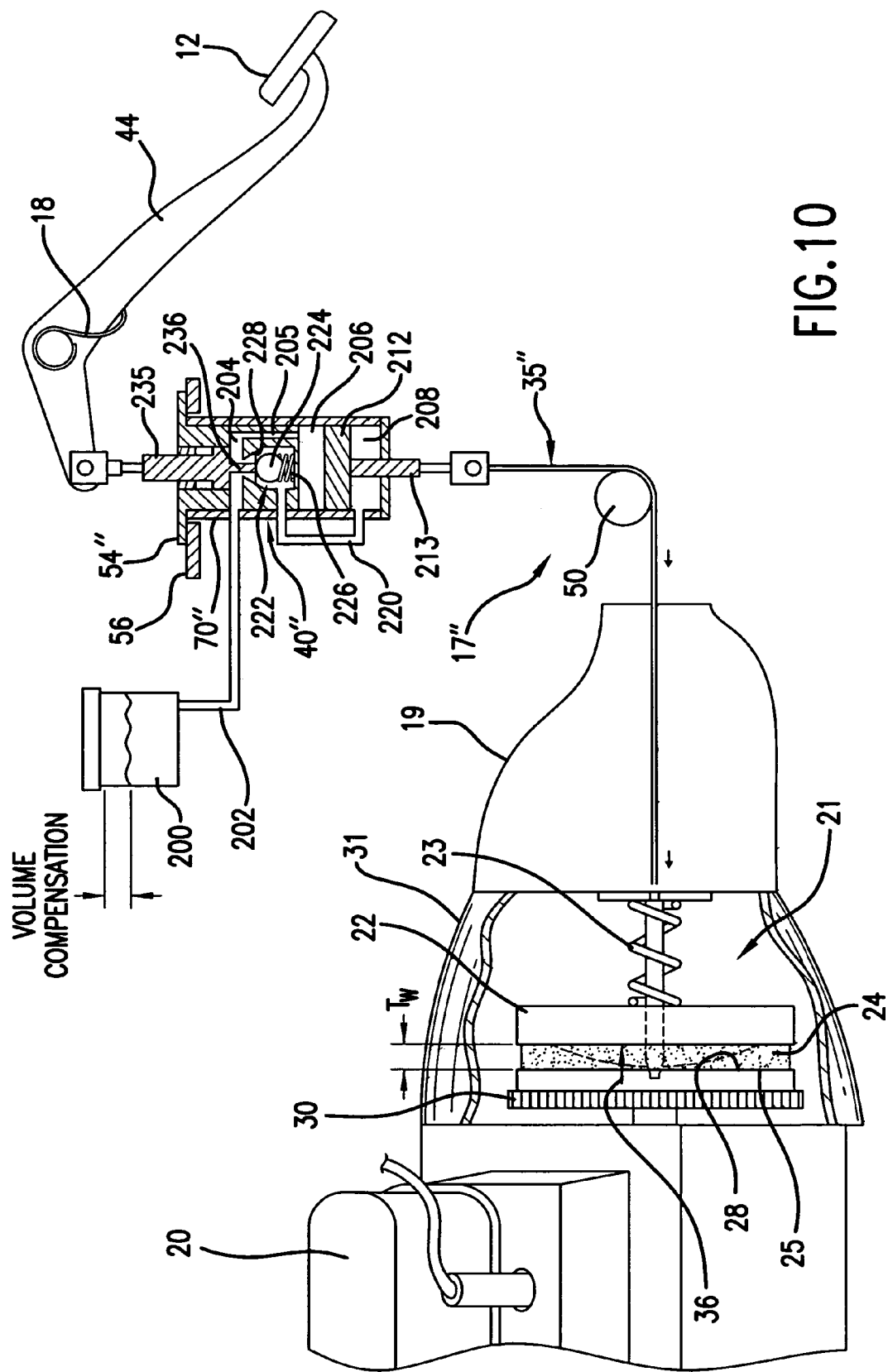
FIG. 10 is a view similar to FIG. 9 but showing the clutch in engaged position after wear.
Figure 11:
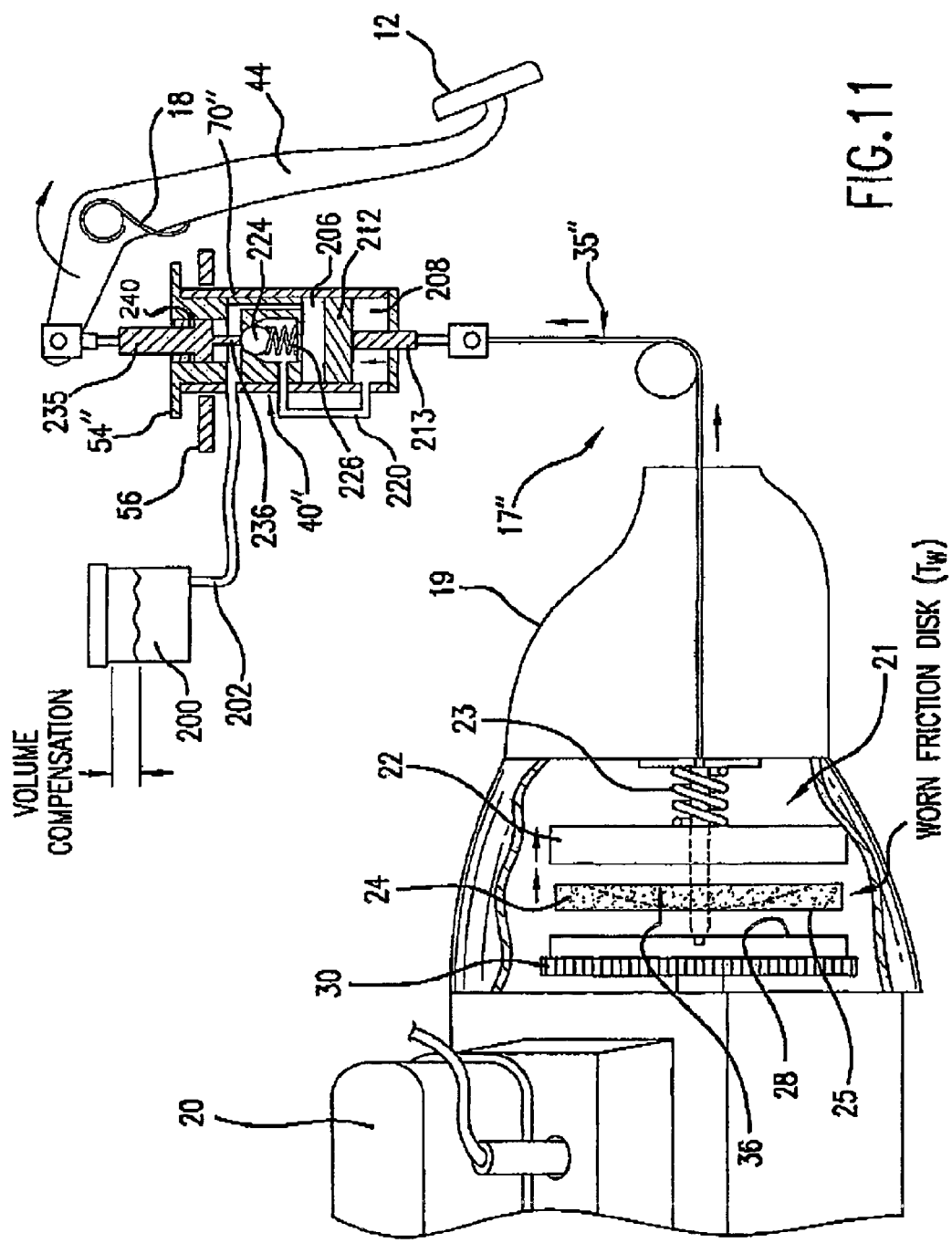
FIG. 11 is a view similar to FIGS. 9 and 10 but showing the clutch being disengaged after wear.

Referring now to FIGS. 9, 10 and 11 where a third embodiment of the clutch arrangement of FIGS. 1 and 2 is schematically shown, a reservoir 200 is shown connected to a low pressure outlet from a cylinder housing 70" of a hydraulic cylinder 40" by a fluid passage 202. The fluid passage 202 is in communication with a space 204 within the valve housing that is connected by an internal fluid passageway 205 to a first chamber 206, which first chamber 206 is separated from a second chamber 208 by a piston 212. The piston 212 is connected by a link portion 35" to the clutch 21 which is biased engaged by the coil spring 23. As with other embodiments of the invention, there is a fluid transfer passage 220, which is shown for clarity outside of the hydraulic cylinder 40'but may be with in the wall 70" of the hydraulic cylinder that connects the second chamber 208 to another portion of the chamber to allow transfer of hydraulic fluid out of the chamber 208 into another portion of the hydraulic system.

In this alternative embodiment of FIGS. 9–11, the fluid transfer passage 220 is connected to a lateral opening on one side of a check valve 222 having a ball 224 that is urged closed against a valve seat 228 by a valve spring 226. When the clutch 21 is engaged as is shown in FIG. 9, an actuator rod 235 having a stem 236 projecting therefrom engages the ball 224 of the check valve 222 to urge the check valve open against the bias of the valve spring 226. The actuator rod 235 is coupled to the foot pedal arm 44 and urged against the ball 222 by the spring 18 that keeps the pedal 12 raised. As long as the clutch pedal 12 is not pressed against the bias of coil spring 18, the stem 236 keeps the check valve 222 open so that fluid can flow from the second chamber 208 through the check valve. Once the fluid passes through the check valve 222, it can accumulate in the first chamber 206 by passing through the internal fluid passageway 205.

Referring now to FIG. 10, when wear occurs, the thickness of the friction disk 24 decreases causing the piston 212 to advance into the second chamber 208 and displace hydraulic fluid through the transfer passage 220 and the check valve 222. Displaced fluid accumulates in the first chamber 206 on the other side of the piston 212 with the reservoir 200 providing extra fluid to top off the system to keep the system full. Upon comparing FIG. 10 to FIG. 9, it is seen that the volume of the chamber 208 has been decreased with respect to the volume in chamber 206. In both FIGS. 9 and 10 the stop flange 54" on the housing 70" is engaged with the stop surface 56 on the bracket 58 (see FIG. 1) supporting the clutch pedal 12.

As is seen in FIG. 11 when the clutch pedal 12 is depressed, the arm 44 moves the actuator 235 upwardly so as to engage a stop 240 which lifts the hydraulic cylinder 40" and pulls the linkage 35" in order to disengage the clutch plate 22 from the flywheel 30. As is seen in FIG. 11, the stop flange 54" on the hydraulic cylinder housing 70" disengages from the stop surface 56, and the stem 236 allows the ball 224 to close under the bias of coil spring 226. When the check valve 222 closes, hydraulic fluid can no longer flow out of the second chamber 208 and the length of the hydraulic cylinder 40," including the piston rod 213 and actuator 235, remains the same as in FIG. 10. Thus, the total length of the clutch linkage 35" is increased to compensate for a decreases in thickness of the friction disk 24 from $T_0$ to $T_w$.

Upon releasing the clutch pedal 12, the clutch system of FIGS. 9-11 returns to the condition of FIG. 9 so that as the clutch continues to wear, the hydraulic cylinder 40" continues to lengthen to compensate for decreases in the thicknesses of the friction disk 24 of the clutch 21.

From the foregoing description, one skilled in the art can easily ascertain the essential characteristics of this invention, and without departing form the spirit and scope thereof, can make various changes and modifications of the invention to adapt it to various usages and conditions.

We claim:

1. A clutch linkage for a self-adjusting clutch system for automotive vehicles, wherein the clutch system includes a pedal connected by the clutch linkage to a clutch plate that is normally biased by a clutch spring to press a friction disk into engagement with a flywheel driven by an engine, the clutch linkage comprising:

an actuator rod having a first end connected to the pedal and a second end having an engagement surface;

a hydraulic cylinder having a first end with a stop surface therein for engagement by the engagement surface of the actuator rod that is moveably mounted in the hydraulic cylinder to pull the hydraulic cylinder when the clutch pedal is depressed to release the clutch;

a piston within the hydraulic cylinder, the piston dividing the hydraulic cylinder into first and second chambers and having a piston rod connected to the clutch by a linkage portion for pulling the clutch to release the clutch when the pedal is depressed to pull the hydraulic cylinder;

a normally-open valve within the first chamber of the hydraulic cylinder and disposed in tandem between the piston and the stop , the normally-open valve being closed by axial movement of the actuator rod upon depressing the clutch pedal, and a fluid passage between the first chamber of the hydraulic cylinder and the normally-open valve to allow hydraulic fluid in the first chamber to be displaced therefrom as the clutch plate wears.

2. The clutch linkage of claim 1 wherein fluid passage is between the first chamber and the second chamber.

3. The clutch linkage of claim 2 wherein the actuator rod has an opening therethrough which aligns with the passage when the pedal is not depressed so that free flow of fluid occurs between the first and second chambers, and wherein the opening misaligns with the passage when the valve is closed, preventing fluid transfer from the first to the second chambers.

4. The clutch linkage of claim 2 wherein second chamber has an expandable capacity.

5. The clutch of claim 4 wherein the valve comprises a passage adjacent to the actuator rod which communicates with an expansion chamber, which passage is closed by a face seal on the actuator rod upon pressing the clutch pedal, the face seal engaging the stop surface within the hydraulic cylinder, which stop surface is provided by an end wall of the first chamber.

6. The clutch linkage of claim 4 wherein the normally-open valve comprises a ball valve held open by a projection on the actuator rod that pushes the valve against the bias of a spring; the valve, when open allowing fluid to flow to the first chamber and to a reservoir, and when closed, blocking fluid flow from the first chamber and the reservoir.

7. The clutch linkage of claim 1 wherein the linkage portion connecting the piston rod to rite clutch for pulling the clutch to release is a flexible element.

* * * * *